US005094429A

United States Patent [19]

Dostert

[11] Patent Number: 5,094,429

[45] Date of Patent: Mar. 10, 1992

[54] VALVE HAVING PIEZOELECRTRIC DRIVE

[75] Inventor: Rainer Dostert, Vaterstetten, Fed. Rep. of Germany

[73] Assignee: Siemens Aktiengesellschaft, Munich, Fed. Rep. of Germany

[21] Appl. No.: 652,541

[22] Filed: Feb. 8, 1991

[30] Foreign Application Priority Data

Mar. 9, 1990 [EP] European Pat. Off. ........ 90104537.7

[51] Int. Cl.[5] .............................................. F16K 31/02

[52] U.S. Cl. ............................ 251/129.06; 239/102.2; 239/584

[58] Field of Search ................ 251/129.06; 239/102.2, 239/584

[56] References Cited

U.S. PATENT DOCUMENTS 3,614,486 10/1971 Smiley ........................ 251/129.06 X
4,158,368 6/1979 Clark .......................... 251/129.06 X
4,340,083 7/1982 Cummins .................. 251/129.06 X

*Primary Examiner*—Arnold Rosenthal
*Attorney, Agent, or Firm*—Hill, Van Sante, Steadman & Simpson

[57] ABSTRACT

A valve has a piezoelectric drive in which a lever mechanism is provided with a prescribed lever ratio and includes a resilient steel fork for the amplitude transformation of the excursion of a piezoceramic element operating as a piezoelectric actuator, a valve lifter connected at one end to a deflectable end of the steel fork and at the other end to a valve needle of a fuel injection valve.

12 Claims, 1 Drawing Sheet

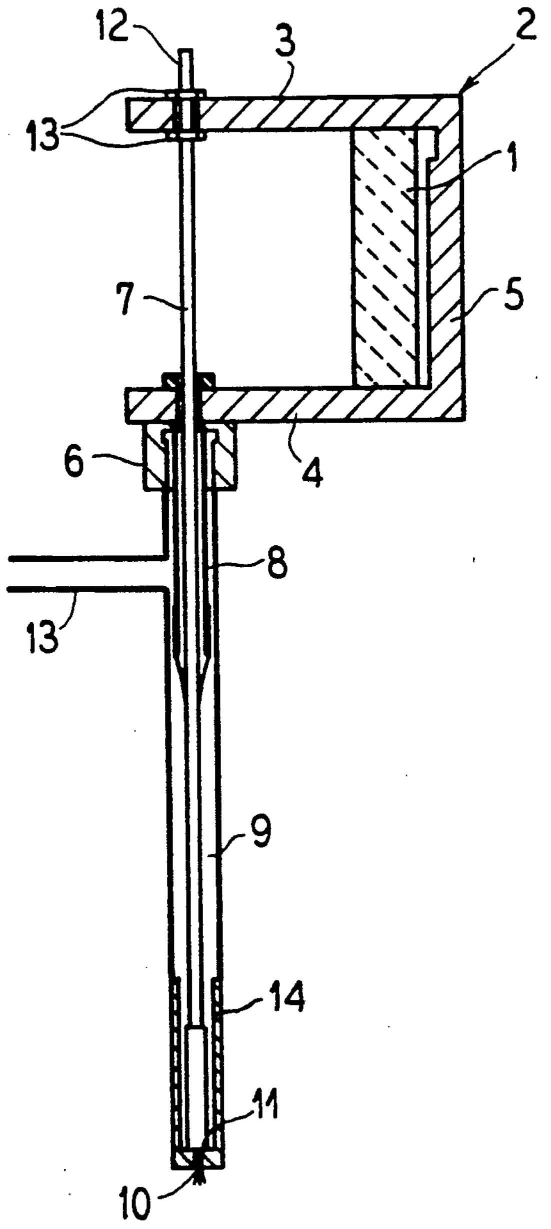
12
3
2
13
1
7
5
6
4
8
13
9
14
11
10

VALVE HAVING PIEZOELECRTRIC DRIVE

BACKGROUND OF THE INVENTION

1. Field of the Invention

The present invention relates to injection valves, and more particularly to a fuel-injection valve having a piezoelectric drive.

2. Description of the Prior Art

Valves having short reaction times are required in certain control executions. Injection valves having extremely short opening and closing times are particularly required for electronically-controlled fuel injection in internal-combustion engines in order to achieve short injection times (below 0.2 ms). Valves that only close slowly tend to form droplets and only offer low dosing accuracy.

Injection valves constructed in accordance with the art heretofore known generally comprise a valve drive based on the electromagnetic principle. Such a valve is opened by an electromagnet. A restoring spring closes the valve after the excitation is terminated. In order to achieve a short opening time, such valves are briefly driven with a high pulse having a high excitation current before a switch is undertaken to a low maintenance current. Due to the quadratic current/force behavior, the closing event, given an electromagnetic valve having a single magnetic coil, cannot be electrically influenced. It is solely dependent on the spring constant of the required restoring spring and on the mass of the valve needle to be moved.

The present invention is based on the perception that, in order to achieve short and defined opening and closing times, the valve can be actively opened and closed by employing a piezoelectric drive having an approximately linear relationship between the drive voltage for a piezoelectric actuator and the effected excursion. The desired proportionality of the injected quantity to the injection time can thereby be achieved, even given extremely-short injection times.

A disadvantage of piezoelectric piston generators, however, is that only relatively small excursions (0.1%–0.2%) can be achieved, so that they cannot be directly employed as actuators for valves.

SUMMARY OF THE INVENTION

The object of the present invention is to provide a valve of the type initially set forth that can be manufactured in a simple and cost-effective manner and that satisfies the requirement of extremely-short reaction times given valve settings that can be achieved in a defined fashion.

The above object is achieved, according to the present invention, in a valve having a piezoelectric drive for which a lever mechanism is provided with a prescribed lever arm relationship for the amplitude transformation of the excursion of a piezoelectric actuator, and a valve lifter or plunger is secured to the deflectable end of the lever mechanism.

According to a particular feature of the invention, the valve is characterized in that the lever mechanism is composed of a U-shaped, springy steel fork having legs which embrace and clamp the piezoelectric actuator.

According to another feature of the invention, the valve, as set forth above, is particularly characterized in that a piezoceramic element having a characteristic with an approximately linear relationship between a drive voltage and a surface length change thereof effected therewith and, therefore, the excursion of a valve lifter, is employed as a piezoelectric actuator.

According to another feature of the invention, the valve is particularly characterized in that the steel fork is designed such that the distance change between the free ends of the steel fork is higher by a factor of 4 than the surface length change of the piezoceramic element.

According to another feature of the invention, the valve is particularly characterized in that the piezoceramic element is constructed as a bar-shaped member having a quadratic cross section with the dimensions 10 mm×10 mm×32 mm and experiences a length change of 40 μm given application of a voltage of 150 V.

According to another feature of the invention, the valve is constructed such that a hollow valve stem is arranged at the other of the free ends of the steel fork topically fixed thereto, the valve seat of the valve being located at the front end of the valve stem, and in that the valve lifter is secured to the deflectable end of the steel fork and is plugged through a bushing of the steel fork and guided in the valve stem, whereby the valve stem and the valve lifter are displaceable relative to one another, i.e. the valve lifter moves axially in the valve stem.

According to another feature of the invention, the valve is a fuel injection valve for use in internal-combustion engines.

BRIEF DESCRIPTION OF THE DRAWING

Other objects, features and advantages of the invention, its organization, construction and operation will be best understood from the following detailed description, taken in conjunction with the accompanying drawing on which there is a single figure which is a side view of a valve constructed in accordance with the present invention and shown partially in section.

DESCRIPTION OF THE PREFERRED EMBODIMENTS

Referring to the drawing, the drive of a valve occurs with a bar-shaped piezoceramic element 1 operating as a piezoelectric actuator that preferably has a quadratic cross section and is fashioned with the dimensions 10 mm×10 mm×32 mm. The piezoceramic element 1 is driven with a voltage up to 150 V and achieves an excursion of 40 μm at 150 V. In order to increase the excursion to values that are typical (100 μm) for opening an injection valve, the piezoelectric actuator is clamped at the inner side of a U-shaped, resilient steel fork 2 having a pair of lever arms 3, 4. Given the excursion (elongation) of the piezoelectric actuator, the free ends of the lever arms 3, 4 of the resilient fork 2 are pressed apart by the resulting lever action. The resilient steel fork 2 is preferably designed such that the distance change between the free ends thereof is higher by the factor 4 than the appertaining surface distance change of the piezoelectric element 1 by the interposition and flexing about the ends of a rigid spacer 5. A valve stem 9 in the form of a hollow tube that is 100 mm long includes a first end which is firmly attached to one of the free ends which terminates the lever arm 4 of the resilient steel fork 2 such as by way of a holding and sealing bushing 6 carried by the free end of the lever arm 4. A valve lifter 7 is coaxially guided by the bushing 6 of the valve stem 4 and carries a threaded section 12 which is attached to the lever arm 3 by a pair of adjustment nuts 13. A guide tube 8, crimped at its distal end, aids in guiding the valve lifter 1 in the tube 4. The valve lifter 7 extends through the valve stem tube 9 to terminate at a needle valve 10 which mates with a valve seat 11 carried at the distal end of the stem tube 9. The valve stem 9 is sealed with a sealing member 14 adjacent and spaced from the valve seat 11. Fuel is admitted to the valve tube 9 at a location spaced from the nozzle formed by the valve needle 10 and the valve seat 11 via a fuel line 13 which is in communication with the valve stem tube 9 via an inlet port. Normally, the valve needle 10 is located mating with the valve seat 11 and therefore closes the valve. When the piezoelectric actuator is deflected (a maximal 40 μm), then the valve needle 10 experiences a stroke of up to 160 μm due to the amplitude transformation of the steel fork 2 and opens the valve.

Due to the extremely high blocking force of the piezoelectric actuator, the spring constant of the resilient steel frame, namely of the steel fork 2, can be selected so high that the actuator is always under the mechanical prestressing of the steel frame, even during contraction. The valve can therefore also be actively closed.

Opening and closing times of less than 100 μs can be realized with the valve described above. This behavior is adequate even given an engine speed of 10,000 rpm. As a result of the extremely-short injection times ($<0.2$ ms), multiple injections per operating cycle can be advantageously realized. This can be utilized for a desired optimization of the combustion process.

In addition, the valve has the advantage that the injected quantity can be controlled via the valve stroke that is variable on the basis of the drive voltage. An additional possibility of fuel dosing is thereby established in comparison to injection valves having only two fixed ultimate positions of the valve needle.

Due to the high blocking power of the piezoelectric actuator, the drive system can be spaced arranged relatively at a distance far (100 mm), from the valve seat with a long valve stem and long valve lifter in order to achieve a saving of space for other, engine-proximate components.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim::

1. Valve apparatus comprising:

a hollow valve stem tube for supporting a fluid flow;

a valve in said hollow valve stem tube operable between and to open and closed conditions, including a valve operating rod extending through said hollow valve stem tube;

a lever mechanism comprising at least one lever arm including first and second ends and a pivot at said second end, said first end connected to said valve operating rod; and a piezoelectric actuator connected to said at least one lever arm spaced from said second end of said at least one lever arm and at a distance therefrom such that movement of said actuator causes an amplified corresponding movement of said first end of said at least one lever arm to correspondingly move said valve operating rod.

2. A valve apparatus comprising:

a hollow valve stem tube for supporting a fluid flow;

a valve in said hollow valve stem tube operable between open and closed conditions, including a valve operating rod extending through said hollow valve stem tube;

a lever mechanism comprising at least one lever arm including first and second ends and a pivot at said second end, said first end connected to said valve operating rod; and a piezoelectric actuator connected to said at least one lever arm spaced from said second end of said at least one lever arm and at a distance therefrom such that movement of said actuator causes an amplified corresponding movement of said first end of said at least one lever arm to correspondingly move said valve operating rod, said lever mechanism comprising a resilient fork including a first leg as said at least one lever arm, a second leg spaced from said first leg, and a cross member connecting said legs and defining said pivot at said second end of said at least one lever arm; and said piezoelectric actuator including a bar-shaped piezoelectric.element connected between said legs.

3. The valve apparatus of claim 2, wherein:

said bar-shaped piezoelectric element is a piezoceramic element.

4. The valve apparatus of claim 2, wherein:

said piezoelectric element comprises a linear voltage/length change characteristic.

5. The valve apparatus of claim 2, wherein:

each of said legs comprises a first end and a second end; and said piezoelectric actuator is located between said first and second ends of each of said legs to provide a distance change of the relative spacing of said first ends by a factor of 4 with respect to the change in relative spacing of said legs at said actuator.

6. The valve apparatus of claim 2, wherein:

said piezoelectric element comprises a quadratic cross section, dimensions of 10 mm×10 mm×32 mm, and experiences a length change of 40 μm in response to the application of 150 V.

7. A fuel injection valve apparatus comprising:

a hollow valve stem for supporting a flow of fuel, including a distal end, a fuel inlet port spaced from said distal end and a proximal end;

a needle valve at said distal end of said hollow valve stem, including a valve seat having a bore therethrough and mounted in said hollow valve stem tube, a valve lifter in said hollow valve stem tube and a valve needle for mating with said valve seat including a first end extending through said bore and a second end connected to said valve lifter, said valve needle operable to mate and unmate with said valve seat;

said valve lifter mounted in sealed sliding relationship within said proximal end of said hollow valve stem tube;

actuator means including a piezoelectric element comprising a first end and a second end, said piezoelectic element further comprising a surface which changes length in response to the application of an actuating voltage to said piezoelectric element; and mounting means mounting said proximal end of said hollow valve stem tube and mounting said second end of said piezoelectric element such that said second end is fixed with respect to said hollow valve stem tube, and including a resilient lever arm comprising first and second ends and a pivot at said second end, said first end of said piezoelectric element connected to said first lever arm spaced from said second end thereof such that length changes of said surface causes an amplified, corresponding movement of said first end of said lever arms, said first end of said lever arm connected to said valve lifter for operating said needle valve in response to energization and deenergization of said piezoelectric element, said first end of said lever arm includes a bore therethrough; and said valve lifter includes a threaded portion extending through said bore and adjustment nuts are threadingly received on said threaded portion on opposite sides of said lever arm to attach said valve lifter to said lever arm.

8. The fuel injection valve apparatus of claim 7, wherein said mounting means is a resilient U-shaped device comprising:

first and second arms each including first and second ends, said first end of said first arm connected to said valve lifter; and a cross member connecting said arms at said second ends and defining the pivot of said first arm located at said second end of said first arm such that movement about said pivot causes amplified corresponding movement of said first ends relative to one another, said piezoelectric element connected between said first and second ends, and said hollow valve stem tube connected to said first end of said second arm.

9. The fuel injection valve apparatus of claim 7, and further comprising:

guide means in said hollow valve stem tube slidingly receiving and guiding said valve lifter axially in said hollow valve stem tube.

10. The fuel injection apparatus of claim 7, and further comprising:

sealing means in said proximal end of said hollow valve stem tube sealing said tube and slidably receiving and sealing about said valve lifter.

11. Valve apparatus comprising:

tube means for supporting a fluid flow, including a fluid inlet section and a nozzle section;

valve means mounted in said nozzle section including a valve seat and a valve needle for mating and unmating with said valve seat;

a lever mechanism including a lever arm comprising a first end, connecting means connecting said first end to said valve needle, a second end and a pivot at said second end; and a piezoelectric element, including a predetermined dimension, connected to said lever arm spaced from said second end and located to provide a lever ratio such that a length change of said piezoelectric element causes an amplified movement of said first end, said piezoelectric element operated to change said predetermined dimension upon application of an actuating voltage thereto to operate said valve means via said lever mechanism.

12. Proportional control valve apparatus comprising:

tube means for supporting a fluid flow, including a fluid inlet section and a nozzle section;

valve means mounted in said nozzle section including a valve seat and a valve needle for mating and unmating with said valve seat;

a lever mechanism including a lever arm comprising a first end, connecting means connecting said first end to said valve needle, a second end and a pivot at said second end; and a piezoelectric element, including a predetermined dimension, and a linear voltage/length change characteristic, connected to said lever arm spaced from said second end and located to provide a lever ratio such that a length change of said piezoelectric element causes an amplified movement of said first end, said piezoelectric element operated to change said predetermined dimension in accordance with its linear voltage/length change characteristic upon application of an actuating voltage thereto to operate said valve means via said lever mechanism so that dosing is controlled in dependence on the magnitude of the applied voltage.

* * * * *

UNITED STATES PATENT AND TRADEMARK OFFICE
CERTIFICATE OF CORRECTION

PATENT NO. : 5,094,429

DATED : March 10, 1992

INVENTOR(S) : Rainer Dostert

It is certified that error appears in the above—identified patent and that said Letters Patent is hereby corrected as shown below:

On the Title page, in the title:

"PIEZOELECRTRIC" should read --PIEZOELECTRIC--

Signed and Sealed this

Sixth Day of April, 1993

*Attest:*

STEPHEN G. KUNIN

*Attesting Officer*

*Acting Commissioner of Patents and Trademarks*